Sept. 16, 1952   I. W. LOVELADY ET AL   2,610,697
GAS AND LIQUID SEPARATOR APPARATUS
Filed March 27, 1950   2 SHEETS—SHEET 1
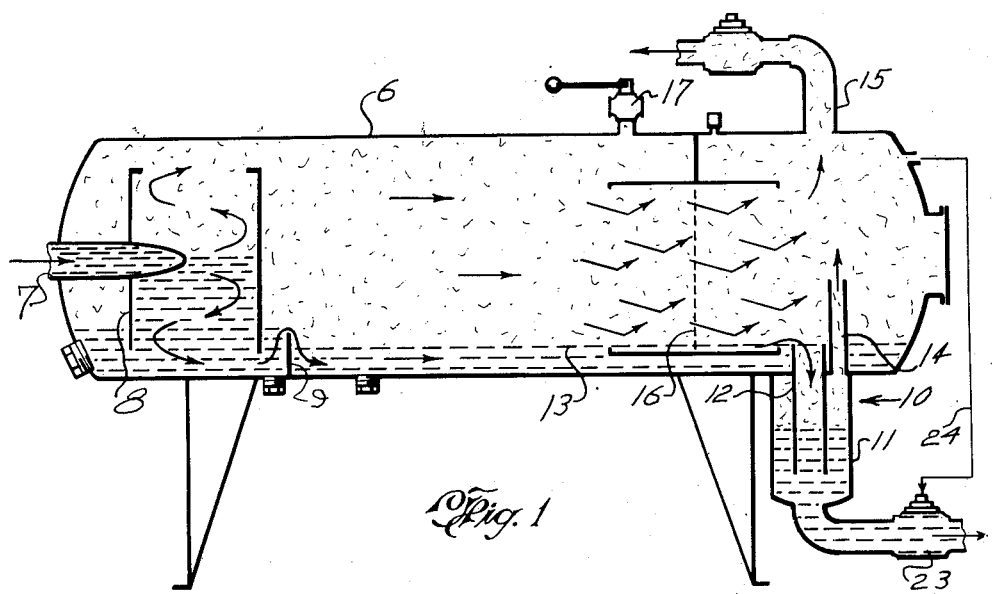
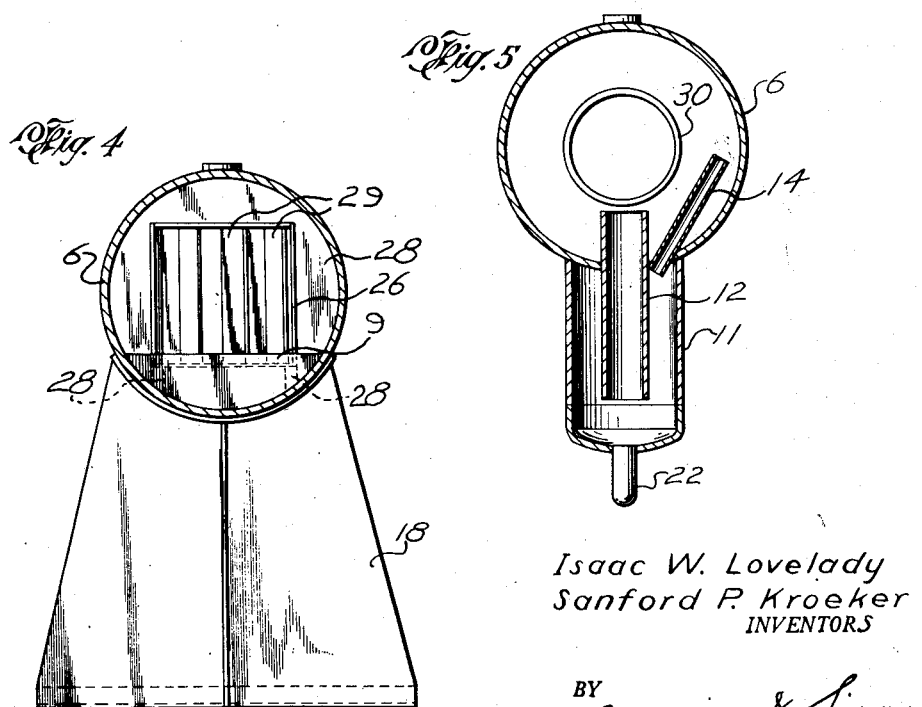
Isaac W. Lovelady
Sanford P. Kroeker
INVENTORS
BY Browning & Simms
ATTORNEYS

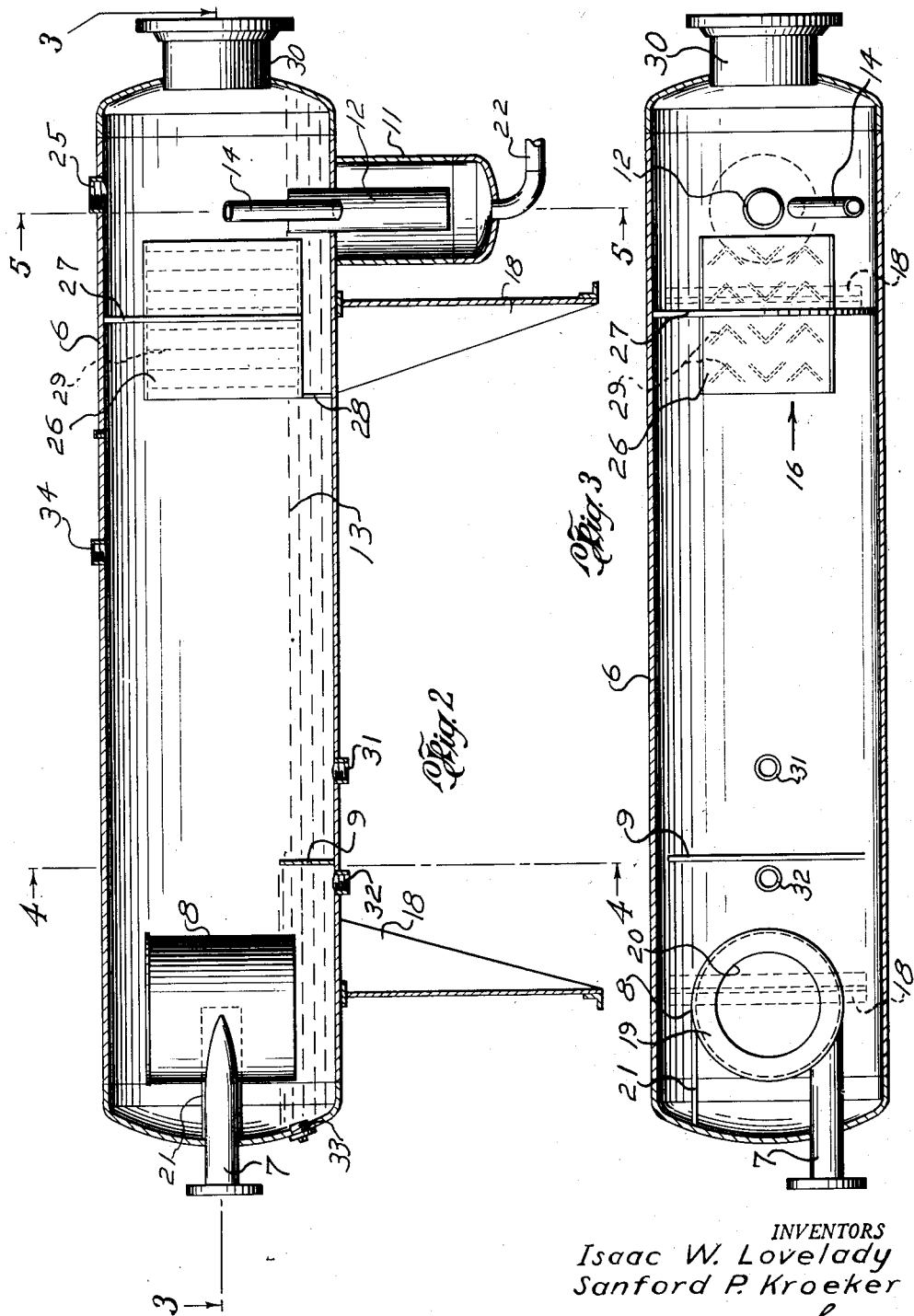

Patented Sept. 16, 1952

2,610,697

UNITED STATES PATENT OFFICE 2,610,697

GAS AND LIQUID SEPARATOR APPARATUS

Isaac W. Lovelady and Sanford P. Kroeker, Odessa, Tex., assignors to Sivalls Tanks, Inc., Odessa, Tex., a corporation of Texas Application March 27, 1950, Serial No. 152,086

11 Claims. (Cl. 183—2.7)

This invention relates to improvements in separator apparatus and refers more particularly to the separation of a mixture of gas and liquid. The apparatus of this invention is especially adapted for the separation of mixtures of petroleum gas and oil produced from oil and gas wells.

In many oil and gas wells, the well fluids produced are a mixture of petroleum gas and crude oil. It is desirable to separate these two general components at or near their location of production after which the separated oil and gas are drawn off through separate lines. It has heretofore been the usual practice to utilize centrifugal separators for this purpose where the volumes to be handled are large, and where only small volumes are to be handled, this separation has been accomplished in the usual storage tanks, gun barrels, and the like. The centrifugal separator has been effective to make a general separation but the gas product has always had an objectionable amount of entrained liquid particles therein and the liquid component has not been completely freed of gas.

An object of this invention is to provide separator apparatus which is rugged, may be economically manufactured, and will separate gas and liquid mixtures into a "dry" gas and substantially gas free liquid.

Another object is to provide in gas and liquid separator apparatus a centrifugal separation element combined with a relatively quiescent zone in which the gas and liquid flow at low velocities, substantially horizontally, with a large area interface surface.

A further object is to provide in gas and liquid separator apparatus employing a centrifugal separation unit, a zone of relative quiescence wherein the gas flows at reduced velocity in a substantially horizontal path with little interference with the settling therefrom of entrained liquid droplets.

Still another object is to provide gas and liquid separator apparatus having a centrifugal separation unit, a quiescent liquid zone beneath a zone of low velocity gas flow and a mist eliminator section of relatively high velocity gas flow.

Yet another object is to provide in gas and liquid separator apparatus a liquid accumulator and draw-off in which the liquid is withdrawn without turbulence and splashing and in which there may be rapid changes of liquid level without disturbing the static gas pressure above the liquid level within the accumulator.

Yet a further object is to provide in a gas and liquid separator, a liquid draw-off controlled by a floatless valve adapted to maintain a selected level within the draw-off accumulator regardless of pressure fluctuations within the separator apparatus.

Other and further objects of the invention will appear as the description proceeds.

In the accompanying drawings forming a part of the instant specification and wherein like reference numerals indicate like parts in the various views:

Fig. 1 is a schematic view illustrating gas and liquid separator apparatus embodying this invention;

Fig. 2 is a view in vertical cross-section, with the interior parts shown in elevation, of the apparatus shown diagrammatically in Fig. 1;

Fig. 3 is a view taken along the line 3—3 in Fig. 2 in the direction of the arrows;

Fig. 4 is a view taken along the line 4—4 in Fig. 2 in the direction of the arrows; and Fig. 5 is a view taken along the line 5—5 in Fig. 2 in the direction of the arrows.

Referring to the drawings, particularly the schematic drawing of Fig. 1, the apparatus of this invention is seen to comprise generally a shell or receptacle 6, of generally elongate character with its longitudinal axis disposed substantially horizontally. The mixture to be separated enters the shell through an inlet fitting 7 at one end of the shell and is first treated in a centrifugal separator 8 located adjacent the inlet end of the shell. A trap means is associated with the centrifugal separator to accumulate the liquid discharged from the separator 8, and this may be provided by the transverse baffle 9. The primary purpose of the trap means is to provide a zone for the turbulent liquid which is separated from the main body of the shell. Adjacent the other end of the shell is a liquid draw-off arrangement 10 to which the overflow from baffle 9 flows with very little turbulence. The draw-off arrangement comprises an accumulator 11 with a weir pipe 12. The weir pipe determines the liquid level, shown at 13, within the main body of the shell and extends into the accumulator past the liquid level usually occurring therein in operation. A vent 14 communicates between the interior of the shell and the space between the accumulator 11 and weir pipe 12 so as to equalize the pressures in these two spaces.

The gas draw-off or outlet for the shell is provided by connection 15 located in the upper portion of the shell but adjacent the liquid draw-off. The gas passage from the upper or gas discharge end of the centrifugal separator 8 to the draw-off 15 has disposed therein a mist eliminator 16, preferably of reduced cross-sectional area compared to the cross-sectional area of the shell 6, so that the flow velocity through the mist eliminator will be greater than that through the main body of the shell. A relief valve 17 may be included in the portion of the shell exposed to the gas, so as to relieve excessive pressures should they develop.

Referring to the drawings in detail and more particularly Figs. 2 to 5 inclusive, the shell 6 may be of any suitable cross-sectional shape, and in the interest of convenient fabrication, preferably is circular. In any event, the shell is elongate with its longitudinal axis extending substantially horizontally and may be mounted on suitable ground supports 18.

The centrifugal separator 8 constitutes a cylinder with its longitudinal axis extending vertically. The inlet connection 7 communicates tangentially with the interior of the cylinder, as is especially well shown in Fig. 3. The cylinder preferably has an inturned flange 19 at its upper end, so that the gas outlet from the cylinder is a central opening 20 of less diameter than that of the cylinder. This reduces the amount of mist that is discharged from the separator.

The cylinder 8 is supported within the shell or tank by the fitting 7 and an auxiliary support 21 secured to the end of the tank.

The lower end of the cylinder is disposed above a trap means for receiving the liquid discharged from the separator cylinder 8. This trap means may be any suitable receptacle with an overflow into the main body of the tank, as is provided by the transversely arranged baffle 9. The function of this means is to provide a zone for the turbulent liquid discharged from the centrifugal separator 8, which will overflow into a relatively quiescent zone constituting the main body of the tank. To reduce splashing, it is preferred that the upper end of the baffle 9 be located at a higher level than the lower end of cylinder 8.

The relatively quiescent zone for the liquid in the tank extends from the baffle 9 to the other end of the tank. Due to the horizontal mounting of the tank, a large area liquid gas interface is provided to allow the escape of gas entrained or dissolved in the liquid. It has been found that the rate of separation of the gas from the liquid body is much greater where the quiescent zone for the liquid is provided.

The liquid draw-off preferably is of the non-splash type and may comprise an accumulator cylinder 11 secured to the underportion of the tank at its end remote from cylinder 8. A smaller diameter weir pipe 12 is sealed in an opening in the underportion of the tank, and the upper end of this pipe determines the level of liquid within the main body of the tank. Thus, the level may be selectively adjusted for any given installation.

Weir pipe 12 extends into the accumulator cylinder 11, and a draw-off means is provided for maintaining the level of liquid within the accumulator, above the lower end of the weir pipe. This may be accomplished by equipping the draw-off pipe 22 with a conventional valve, preferably of the floatless type, shown schematically in Fig. 1 at 23. This valve has a diaphragm control with one side of the diaphragm exposed to the pressure within the interior of the tank through the connection 24, shown diagrammatically. The valve is adapted to open to permit draw-off whenever the depth of liquid within the accumulator 11 provides a selected static pressure for opening the valve.

In order that rapid changes of liquid level within the accumulator will not increase the pressure of the gas between the weir pipe 12 and the accumulator, a vent pipe 14 is disposed in an opening in the tank establishing communication between the annulus and the interior of the tank above the weir pipe 12.

The gas flowing between the gas discharge of the centrifugal separator 8 and the outlet 15, which connects to the opening 25, usually contains an entrained mist. The elongate passage through the tank 6 extends substantially horizontally and thus, the flow of gas does not blow the droplets of liquid upwardly but allows them to fall freely under the influence of gravity. Also, the relatively large cross-sectional area of the gas passage through the tank, as compared to the discharge outlet of cylinder 8, assures a low velocity for the gas contributing to the settling of the liquid droplets. However, it is usually advisable, where the gas discharge from the tank is to be substantially liquid free or "dry," to employ a mist eliminator.

This mist eliminator is shown generally at 16 and may consist of a tubular member 26 disposed in an opening in plate 27 disposed transversely of the tank and sealed to the inner wall thereof. This plate blocks the gas passage, except for the passages through the tubular member 26, for its lower edge and that of the tubular member is below the upper end of weir pipe 12 so as to terminate beneath the liquid level within the tank during operation. The tubular member may have lower supports 28, shown in Figs. 2 and 4, which do not greatly obstruct the flow of liquid.

Tubular member 26 has means in its interior to provide a plurality of zig-zag passages through which the gas must travel. Any suitable mist eliminator construction may be employed for this purpose but the V-shaped baffles 29, mounted vertically and reversely arranged, are preferred.

The tank may be equipped with the usual manhole entrance 30 and drains 31 and 32 as well as an opening 33 and may be equipped with a liquid level gauge. The relief valve 17 may be fitted in opening 34 in the upper portion of the tank.

In operation the liquid gas mixture enters the device through inlet 7 and discharges tangentially into cylinder 8. The velocity of the entering mixture is very high and the cylindrical character of the cylinder imparts a swirling motion to the mixture to provide a centrifugal force to effect a general separation of liquid and gas. The liquid portion of the mixture discharges into the trap means beneath the cylinder and most of the turbulence of the liquid is dissipated in this means.

The overflow from the trap means discharges into the main body of the tank. The liquid then passes from the overflow through a relatively quiescent zone to the discharge weir pipe 12 where it drips downwardly into the accumulator 11. The arrangement provides for a substantially non-splash exit for the liquid discharged. The discharge of liquid from accumulator 11 is in response to the static head of pressure of the liquid, due to the valve 23.

The quiescent zone of liquid and the very large area gas liquid interface provides very complete separation of any gas which is carried by the liquid discharged from the centrifugal separator.

The gas from the centrifugal separator 8 is discharged into the large cross-sectional area passage through the tank and flows substantially horizontally. The entrained liquid droplets are free to fall transversely of the direction of the flow of gas, under the influence of gravity.

The mist eliminator is effective to separate the last traces of the droplets from the gas. The reduced cross-sectional area of the gas passage through the mist eliminator increases the velocity of the gas flowing through the eliminator, and elements 29 pick up the liquid droplets which, because of their weight and momentum, are unable to negotiate the zig-zag passages. They strike the elements 29 and drain into the liquid bath. The lower end of the mist eliminator extends into the bath so that the liquid draining down blends into the main body of liquid without splashing.

The gas discharged from the mist eliminator is substantially "dry" and may be discharged through outlet 25 into a gas receiving system.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gas and liquid separator comprising an elongate tank mountable with its longitudinal axis extending horizontally and having a main body portion, a centrifugal separator cylinder mounted upright within the tank adjacent one end, trap means beneath the cylinder to receive the turbulent liquid from the cylinder with an overflow communicating with the main body portion of the tank, a liquid draw-off for the tank remote from the separator cylinder including a weir to maintain a predetermined liquid level within the main body portion of the tank between said trap means and said weir, and a gas draw-off in the upper portion of the tank, also remote from the separator cylinder whereby there is provided in the main body portion of said tank a relatively quiescent zone through which the gas and separated liquid flow substantially horizontally with an interface therebetween of substantial area.

2. The combination of claim 1 wherein the trap means is provided by an upright baffle arranged transversely of the tank adjacent the separator cylinder but downstream therefrom, said baffle extending upwardly above the upper level of the weir.

3. A gas and liquid separator comprising an elongate tank mountable with its longitudinal axis extending horizontally and having a main body portion, a centrifugal separator cylinder mounted upright within the tank adjacent one end and upstream of said main body portion, trap means beneath the cylinder to receive the turbulent liquid from the cylinder with an overflow communicating with the main body portion of the tank, a liquid draw-off for the tank remote from the separator cylinder including a weir to maintain a predetermined liquid level within the main body portion of the tank between said trap means and said weir, a gas draw-off in the upper portion of the tank, also remote from the separator cylinder whereby there is provided in the main body portion of said tank a relatively quiescent zone through which the gas and separated liquid flow substantially horizontally with an interface therebetween of substantial area, and a mist eliminator within the tank adjacent the downstream end of said body portion but upstream of said gas draw-off.

4. The combination of claim 3 wherein the mist eliminator is a means in a tubular enclosure providing a plurality of zig-zag passages, the cross-sectional area of the enclosure being much less than that of the tank and the enclosure being sealingly secured to the tank against flow of gas exteriorly of the enclosure.

5. The combination of claim 3 wherein the mist eliminator provides a constriction in the passage through the main body of the tank, to increase the velocity of flow through the eliminator.

6. A gas and liquid separator comprising an elongate tank mountable with its longitudinal axis extending horizontally and having a main body portion intermediate its ends, a centrifugal separator cylinder mounted upright within the tank adjacent one end, trap means beneath the cylinder to receive the liquid from the cylinder and adapted to maintain a liquid level somewhat above the lower end of the cylinder to thereby provide a liquid seal across such end, a liquid draw-off for the tank remote from the separator cylinder including a weir pipe extending into said tank to maintain a predetermined liquid level within the main body portion of the tank between said trap means and said weir and an accumulator receptacle under said tank with said weir pipe extending thereinto, and a gas draw-off in the upper portion of the tank also remote from the separator cylinder whereby there is provided in the main body portion of said tank a relatively quiescent zone through which the gas and separated liquid flow substantially horizontally with an interface therebetween of substantial area.

7. A gas and liquid separator comprising an elongate tank mountable with its longitudinal axis extending horizontally, a centrifugal separator cylinder mounted upright within the tank adjacent one end, trap means beneath the cylinder to receive the turbulent liquid from the cylinder with an overflow communicating with the main body of the tank, a liquid draw-off for the tank remote from the separator cylinder including an accumulator receptacle sealingly secured to and depending from the under portion of the tank, a weir pipe extending into the tank and the accumulator, the extension of said weir pipe into the tank being sufficient to maintain a predetermined liquid level in the main body of the tank, and a vent for the upper portion of the space between the weir pipe and accumulator, said vent extending into the tank above the upper end of the weir pipe; and a gas draw-off in the upper portion of the tank also remote from the separator cylinder.

8. A gas and liquid separator comprising an elongate tank mountable with its longitudinal axis extending horizontally, a centrifugal separator cylinder mounted upright within the tank adjacent one end, trap means beneath the cylinder to receive the turbulent liquid from the cylinder with an overflow communicating with the main body of the tank, a liquid draw-off for the tank remote from the separator cylinder including an accumulator receptacle sealingly secured to and depending from the under portion of the tank, a weir pipe extending into the tank and the accumulator, and a vent for the upper portion of the space between the weir pipe and accumulator, said vent extending into the tank above the upper end of the weir pipe, a valve controlling a drain for the accumulator responsive to the level of liquid in the accumulator; and a gas draw-off in the upper portion of the tank also remote from the separator cylinder.

9. Gas and liquid separator apparatus comprising an elongate closed receptacle mountable with its longitudinal axis extending horizontally, means at one end of the receptacle for introducing a fluid mixture and centrifugally separating the mixture into predominantly gas and liquid components, means for receiving the liquid component in a confined zone of turbulence, a weir pipe liquid draw-off at the other end of the receptacle providing a quiescent liquid zone of selected depth extending therefrom to the receiving means, and a gas outlet adjacent the liquid draw-off.

10. Gas and liquid separator apparatus comprising an elongate closed receptacle mountable with its longitudinal axis extending horizontally, means at one end of the receptacle for introducing a fluid mixture and centrifugally separating the mixture into predominantly gas and liquid components, means for receiving the liquid component in a confined zone of turbulence and then discharging the same into the portion of the receptacle downstream therefrom, a weir pipe liquid draw-off at the other end of the receptacle providing a quiescent liquid zone of selected depth extending therefrom to the receiving means, a gas outlet adjacent the liquid draw-off, and a mist eliminator means in the receptacle adjacent the gas outlet but intermediate it and the centrifugal means, said eliminator means constricting the gas passage through the receptacle sufficiently to materially increase the velocity of flow therethrough.

11. Gas and liquid separator apparatus comprising a horizontally disposed elongate tank, a vertically arranged cylinder within the tank at one end, an inlet fitting for injecting a mixture to be separated tangentially into the cylinder at a position intermediate its length, an upright baffle transverse of and within the tank adjacent the cylinder with the cylinder between it and the inlet end of the tank, a weir pipe liquid draw-off adjacent the other end of the tank to provide a selected liquid level within the main body of the tank somewhat under the upper end of said baffle, a gas outlet adjacent the liquid draw-off, a vertical plate arranged transversely of the tank adjacent the outlet and liquid draw-off but intermediate them and the centrifugal separator, the periphery of the plate, except for its lower edge, closely conforming to the inner wall of the tank, the lower edge of the plate spaced from the lower wall of the tank at a level within the tank somewhat below the upper end of the weir pipe, an opening in the plate with a tubular member therein, and vertical means mounted within the tubular member providing a plurality of zig-zag passages extending through the member, the cross-sectional area of the tubular member being greatly less than the cross-sectional area of the tank.

ISAAC W. LOVELADY.
SANFORD P. KROEKER.

REFERENCES CITED

The following references are of record in the file of this patent:

UNITED STATES PATENTS

| Number | Name | Date |
|---|---|---|
| 1,248,054 | Armstrong | Nov. 27, 1917 |
| 1,835,957 | Lincoln | Dec. 8, 1931 |
| 2,214,658 | Browning | Sept. 10, 1940 |
| 2,349,944 | Dixon | May 30, 1944 |